US008348486B2

(12) United States Patent
Nakada

(10) Patent No.: US 8,348,486 B2
(45) Date of Patent: *Jan. 8, 2013

(54) VEHICULAR LAMP UNIT AND VEHICULAR LAMP

(75) Inventor: Yusuke Nakada, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 451 days.

This patent is subject to a terminal disclaimer.

(21) Appl. No.: 12/607,711

(22) Filed: Oct. 28, 2009

(65) Prior Publication Data

US 2010/0110716 A1 May 6, 2010

(30) Foreign Application Priority Data

Oct. 30, 2008 (JP) ................................ 2008-278980

(51) Int. Cl.
*B60Q 1/00* (2006.01)
*H01J 9/24* (2006.01)
*F21V 7/00* (2006.01)

(52) U.S. Cl. ........... 362/538; 445/23; 362/517; 362/539

(58) Field of Classification Search .......... 362/516–519, 362/538, 539, 545
See application file for complete search history.

(56) References Cited

U.S. PATENT DOCUMENTS 6,494,603 B1 12/2002 Takada
7,470,050 B2 * 12/2008 Futami .......................... 362/514
2006/0028833 A1 * 2/2006 Yagi et al. ...................... 362/538
2007/0019431 A1 * 1/2007 Kinoshita ..................... 362/517
2007/0247865 A1 10/2007 Kinoshita et al.

(Continued)

FOREIGN PATENT DOCUMENTS

DE 100 35 130 A1 2/2001

(Continued)

OTHER PUBLICATIONS

European Search Report for European Application No. 09013227.5-1268 mailed on Jan. 22, 2010, 7 pages.

(Continued)

*Primary Examiner* — Stephen F Husar
*Assistant Examiner* — James Cranson, Jr.
(74) *Attorney, Agent, or Firm* — Osha Liang LLP

(57) ABSTRACT

A vehicular lamp unit includes a projection lens disposed on an optical axis extending in a vehicular longitudinal direction; a light source disposed rearward of a rear side focal point of the projection lens; a reflector reflecting direct light from the light source forward towards the optical axis; a shade disposed between the projection lens and the light source such that the shade blocks a part of reflected light from the reflector and a part of the direct light from the light source to form a cut-off line of a light distribution pattern; a first reflective surface formed on a tip portion of the reflector such that the first reflective surface reflects a part of the direct light from the light source downward to the front of the shade; and a second reflective surface formed on the front of the shade and below the rear side focal point of the projection lens such that the second reflective surface reflects reflected light from the first reflective surface towards the projection lens. The first reflective surface is formed in a shape of an ellipsoidal reflective surface having a vertical cross-section that is generally ellipsoidal in shape, and the second reflective surface is formed in a generally flat shape having a linear vertical cross-section.

8 Claims, 4 Drawing Sheets

U.S. PATENT DOCUMENTS

| | | | | |
|---|---|---|---|---|
| 2009/0097268 | A1* | 4/2009 | Mochizuki | 362/538 |
| 2010/0110715 | A1* | 5/2010 | Nakada | 362/538 |
| 2010/0118559 | A1* | 5/2010 | Nakada | 362/539 |

FOREIGN PATENT DOCUMENTS

| | | | |
|---|---|---|---|
| EP | 1 357 332 | A2 | 10/2003 |
| JP | 2006-107955 | A | 4/2006 |

OTHER PUBLICATIONS

English abstract of Japanese Publication No. 2006-107955 published on Apr. 20, 2006, esp@cenet database, 1 page.

Communication pursuant to Article 94(3) EPC issued in European Application No. 09 013 227.5-1268 dated Dec. 27, 2010, 6 pages.

* cited by examiner

VEHICULAR LAMP UNIT AND VEHICULAR LAMP

BACKGROUND OF INVENTION

1. Field of the Invention

The present invention relates to a vehicular lamp unit and a vehicular lamp of so-called projector-type, and particularly relates to a vehicular lamp unit and a vehicular lamp provided with a shade that forms a cut-off line of a light distribution pattern.

2. Related Art

Conventionally, as one form of a vehicular lamp such as a headlamp, a so-called projector-type vehicular lamp is known. This projector-type vehicular lamp is structured to collect and reflect light from a light source disposed on an optical axis to the front towards the optical axis using a reflector, and to radiate the reflected light to the front of the lamp via a projection lens provided in front of the reflector.

It is common that, when such a projector-type lamp unit is used as a low-beam headlamp, a shade is provided between the projection lens and the light source, and a part of the reflected light from the reflector and a part of direct light from the light source are blocked by the shade, thereby forming a cut-off line of a light distribution pattern. Therefore, for instance, the light that is incident below the reflector and blocked by the shade becomes loss of light that does not contribute to the light distribution projected forward. Particularly, when a semiconductor light-emitting element is used as the light source, an amount of radiated light is likely to be insufficient.

Accordingly, there has been proposed a projector-type lamp unit provided with a main reflector having a first reflective surface that reflects direct light from a light source to the front towards an optical axis, and a sub-reflector including a shade mechanism having a second reflective surface disposed in between a convex lens (projection lens) and the light source and formed in a generally flat shape along an optical axis of the convex lens (for instance, Patent Document 1).

With the use of such a lamp unit, by reflecting a part of reflected light from the main reflector upward using the second reflective surface of the sub-reflector, it is possible to effectively utilize the light, which is blocked and thus not used, to perform beam radiation to the lower side of a cut-off line.

[Patent Document 1] Japanese Patent Application Laid-Open (Kokai) No. JP-A-2006-107955

SUMMARY OF INVENTION

However, even when a part of the reflected light from the main reflector is reflected upward by the second reflective surface of the sub-reflector as in the above-described lamp unit, the light cannot be radiated at all above the cut-off line of the light distribution pattern. If the light is not radiated at all above the cut-off line, a forward visibility is not good, and it is hard to recognize an object on an opposite lane. Specifically, radiated light with such a level that the light does not give a glare to a vehicle on the opposite lane is necessary for improving the forward visibility also above a cut-off line in a low-beam light distribution pattern.

Accordingly, one or more embodiments of the present invention provide a vehicular lamp unit and a vehicular lamp capable of improving a forward visibility by radiating light also above a cut-off line of a light distribution pattern.

One or more embodiments of the present invention relate to a vehicular lamp unit having a projection lens disposed on an optical axis extending in a vehicular longitudinal direction, a light source disposed rearward of a rear side focal point of the projection lens, a reflector reflecting direct light from the light source to the front towards the optical axis, and a shade disposed between the projection lens and the light source and blocking a part of reflected light from the reflector and a part of the direct light from the light source to form a cut-off line of a light distribution pattern. The vehicular lamp unit is characterized by including: a first reflective surface that is formed on a tip portion of the reflector and reflects a part of the direct light from the light source downward to the front of the shade; and a second reflective surface that is formed on the front of the shade and below the rear side focal point of the projection lens, and reflects reflected light from the first reflective surface towards the projection lens. In the vehicular lamp unit, the first reflective surface is formed in a shape of ellipsoidal reflective surface having a vertical cross-section that is generally ellipsoidal in shape, and the second reflective surface is formed in a generally plate shape having a linear vertical cross-section.

With the use of the vehicular lamp unit structured as above, after a part of the direct light from the light source is reflected by the first reflective surface having a shape of ellipsoidal reflective surface formed on the tip portion of the reflector, the reflected light is further reflected towards the projection lens by the second reflective surface having a generally plate shape formed on the front of the shade and below the rear side focal point of the projection lens. Subsequently, the light incident on the projection lens from the second reflective surface is emitted as upward directed radiated light, which enables to radiate above the cut-off line of the light distribution pattern.

In one or more embodiments, it is preferable that in the vehicular lamp unit structured as above, the first reflective surface include: a first reflective surface for right-side light distribution that reflects light from the light source towards the second reflective surface for right-side light distribution formed on the front of the shade for right-side light distribution that forms a cut-off line of a light distribution pattern for right-side light distribution and below the rear side focal point of the projection lens; and a first reflective surface for left-side light distribution that reflects light from the light source towards the second reflective surface for left-side light distribution formed on the front of the shade for left-side light distribution that forms a cut-off line of a light distribution pattern for left-side light distribution and below the rear side focal point of the projection lens.

With the use of the vehicular lamp unit having such a structure, because the reflector can be used for both the vehicular lamp unit for right-side light distribution and the vehicular lamp unit for left-side light distribution, the number of parts can be reduced.

Further, in one or more embodiments of the present invention, the vehicular lamp is characterized in that an entire light distribution pattern is formed by combining a light distribution from the vehicular lamp unit structured as above and a light distribution from another vehicular lamp unit having a light collecting power higher than a light collecting power of the above vehicular lamp unit.

With the use of the vehicular lamp structured as above, when light distributions from a plurality of lamp units are combined to form an entire light distribution pattern, by forming the first reflective surface and the second reflective surface on the reflector and the shade, respectively, in a diffusing-type lamp unit having a light collecting power lower than that of another vehicular lamp unit, it is possible to easily radiate above the cut-off line of the light distribution pattern in a diffused manner along a vehicle width direction.

With the use of the vehicular lamp unit according to one or more embodiments of the present invention, the light incident on the projection lens from the second reflective surface after being reflected by the first reflective surface is emitted as the upward directed radiated light, which enables to radiate above the cut-off line of the light distribution pattern. Accordingly, it is possible to improve the forward visibility.

Other aspects and advantages of the invention will be apparent from the following description, the drawings and the claims.

DETAILED DESCRIPTION

Hereafter, embodiments of a vehicular lamp unit and a vehicular lamp according to the present invention will be described in detail with reference to accompanying drawings.

Figure 1:
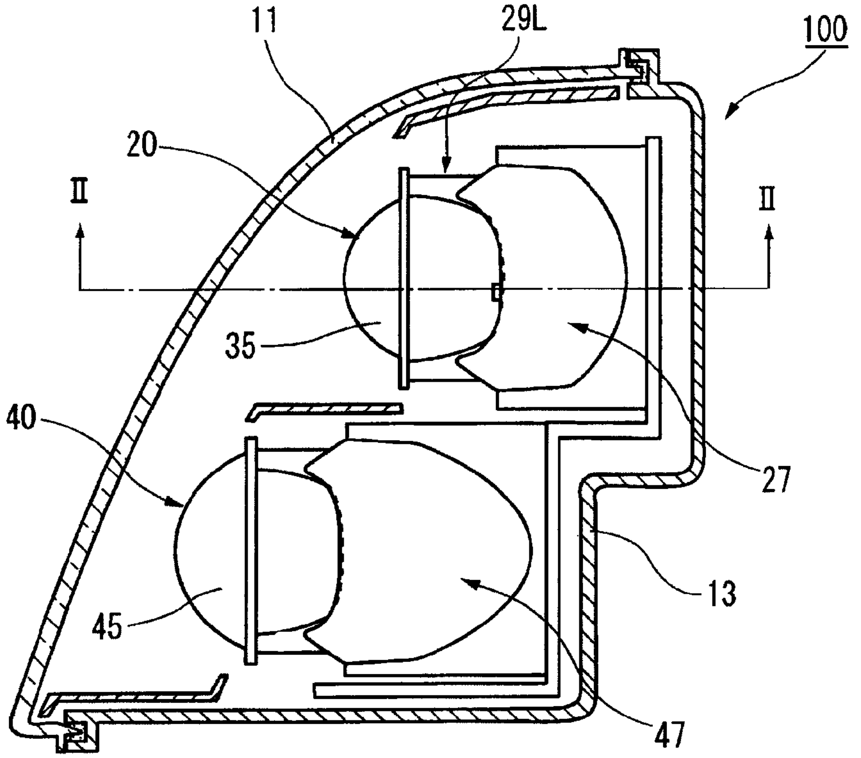
FIG. 1 is a horizontal cross sectional view of a vehicular lamp according to one or more embodiments of the present invention.

FIG. 1 is a horizontal cross sectional view of a vehicular lamp according to one or more embodiments of the present invention.

A vehicular lamp 100 is a low-beam headlamp, and is structured such that, in a lamp chamber formed of a plain translucent cover 11 and a lamp body 13, a plurality of lamp units (two are shown) are housed side-by-side. The plurality of lamp units are formed of a lamp unit (vehicular lamp unit) 20 having a low light collecting power and another lamp unit (another vehicular lamp unit) 40 having a light collecting power higher than that of the lamp unit 20.

These lamp units 20, 40 are supported in the lamp body 13 via a frame (not shown), and the frame is supported in the lamp body 13 via an aiming mechanism (not shown).

The aiming mechanism is a mechanism for finely adjusting attachment positions and attachment angles of these lamp units 20, 40. The aiming mechanism is designed such that when the aiming adjustment is completed, a lens central axis Ax of each of the lamp units 20, 40 extends in a downward direction by about 0.5 to 0.6 degrees relative to a vehicular longitudinal direction.

As will be described later, the lamp unit 20 forms a diffusion zone formation pattern WZ having horizontal and oblique cut-off lines on an upper end edge thereof. The lamp unit 40 forms a hot zone formation pattern HZ having horizontal and oblique cut-off lines on an upper end edge thereof.

Figure 7:
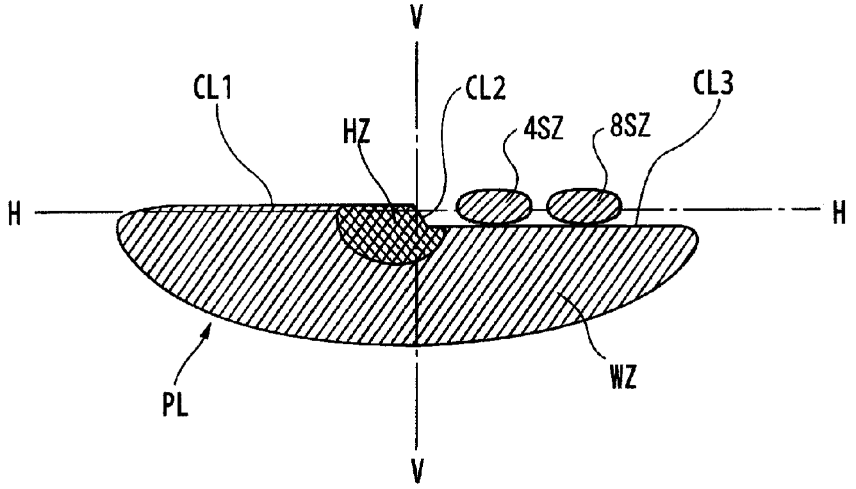
FIG. 7 is a view that shows, in a perspective manner, a low-beam light distribution pattern formed on a virtual vertical screen disposed at a position 25 meters ("m") ahead of the lamp by light radiated from the lamp unit shown in FIG. 2.

Specifically, a low-beam light distribution pattern PL formed by the vehicular lamp 100 is designed to be formed as a combined light distribution pattern of the diffusion zone formation pattern WZ and the hot zone formation pattern HZ formed by these two lamp units 20, 40 (refer to FIG. 7).

These lamp units 20, 40, which serve as low-beam light distribution pattern forming units are structured as projector-type lamp units each formed of a light source and a projection lens provided on a front side of the light source, as will be described later.

Hereinafter, a structure of each of the lamp units 20, 40 will be described.

Firstly, a structure of the lamp unit 20 will be described.

Figure 2:
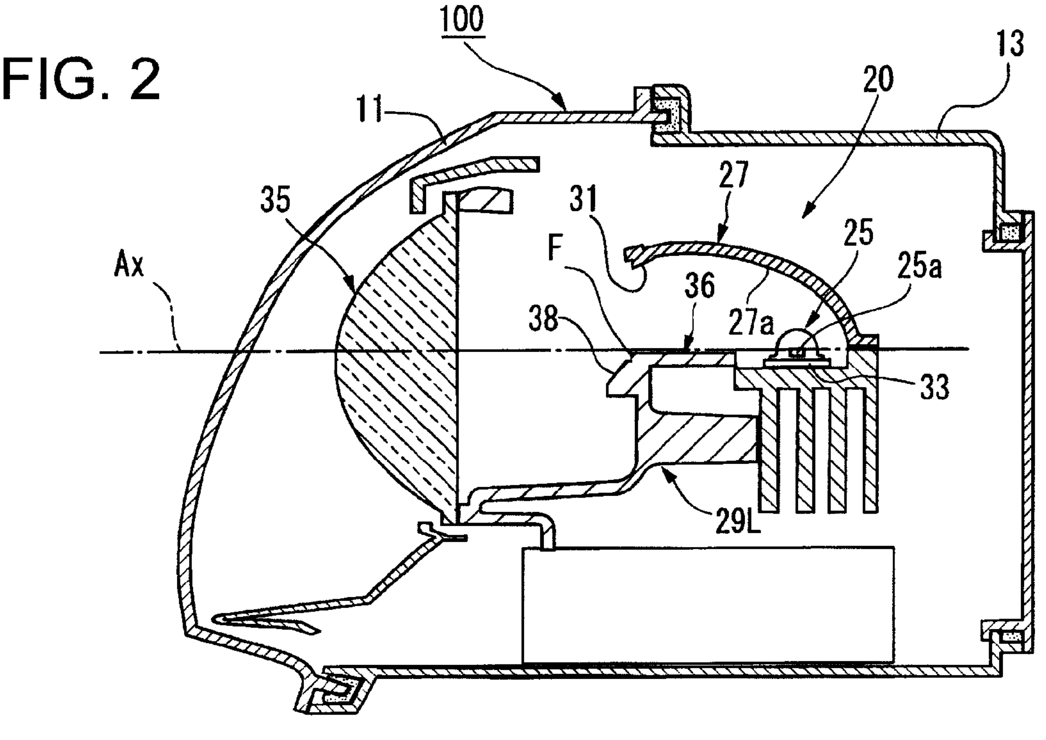
FIG. 2 is an arrow view along the line II-II in FIG. 1.
Figure 3:
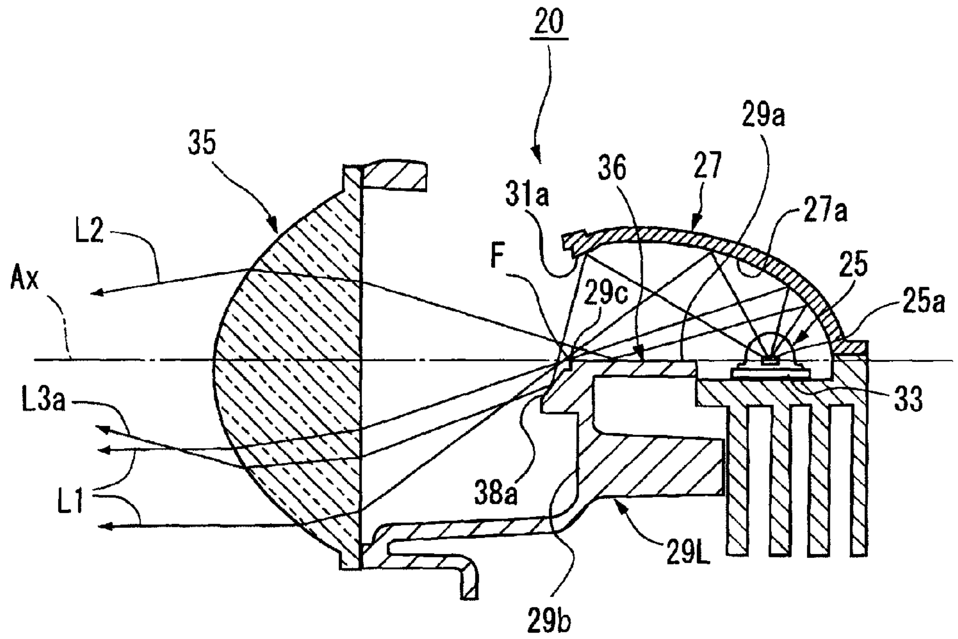
FIG. 3 is a longitudinal sectional view that explains a basic structure of a lamp unit shown in FIG. 2.
Figure 4:
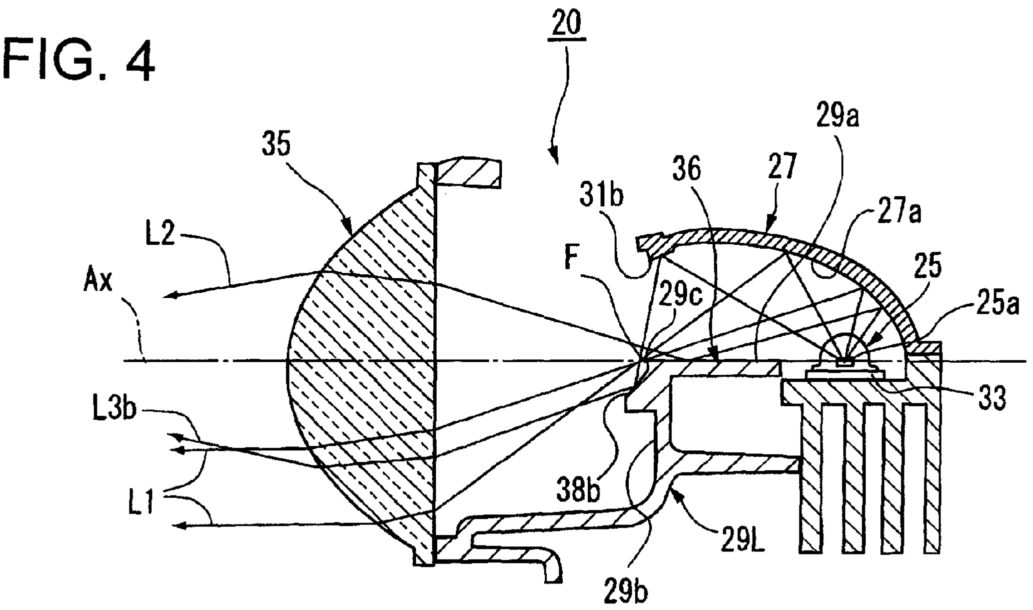
FIG. 4 is a longitudinal sectional view that explains the basic structure of the lamp unit shown in FIG. 2.
Figure 5:
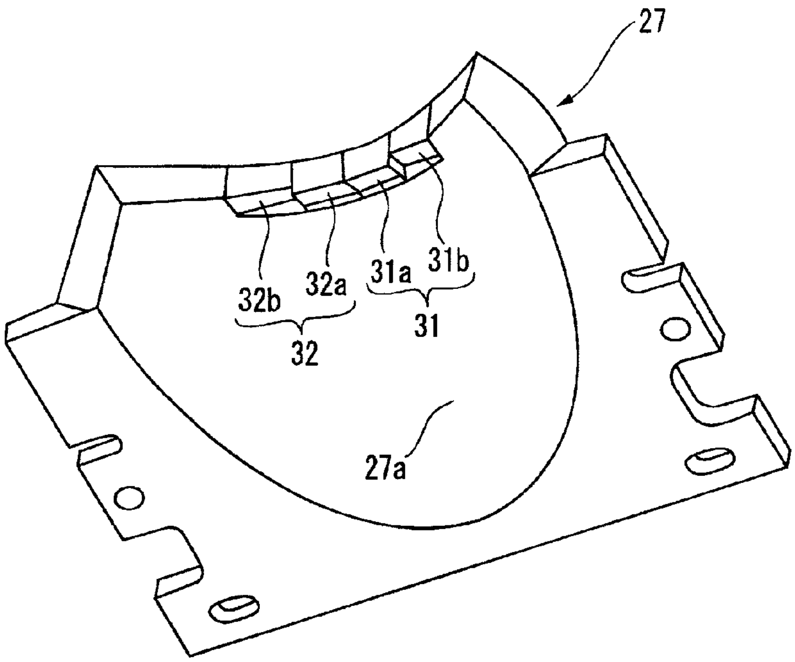
FIG. 5 is a lower perspective view of a reflector shown in FIG. 2.
Figure 6:
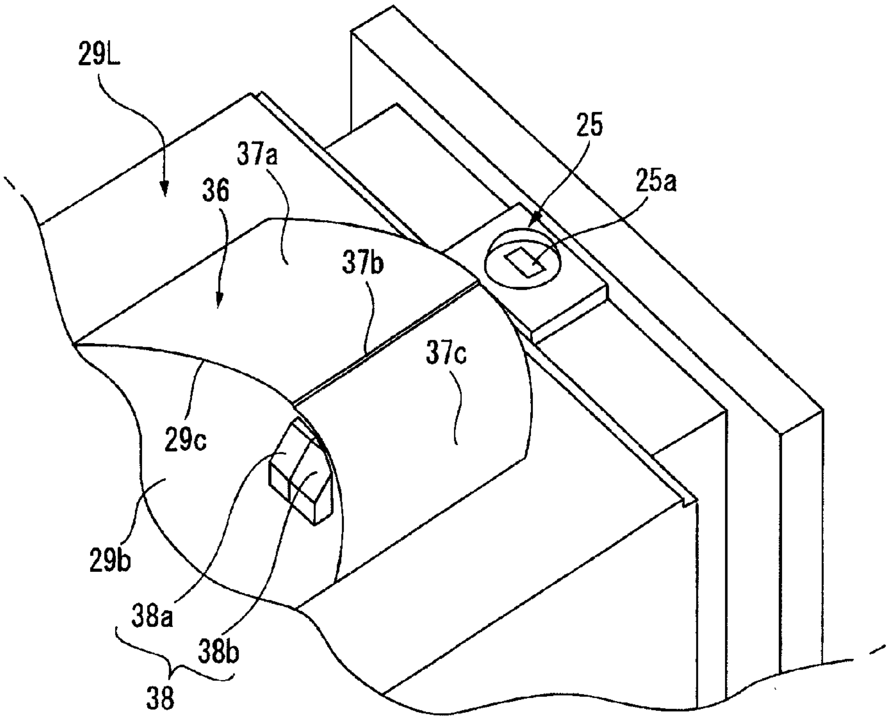
FIG. 6 is an upper perspective view of a shade shown in FIG. 2.

FIG. 2 is an arrow view along the line II-II in FIG. 1, FIG. 3 and FIG. 4 are longitudinal sectional views that explain a basic structure of a lamp unit shown in FIG. 2, FIG. 5 is a lower perspective view of a reflector shown in FIG. 2, FIG. 6 is an upper perspective view of a shade shown in FIG. 2, and FIG. 7 is a view that shows, in a perspective manner, a low-beam light distribution pattern formed on a virtual vertical screen disposed at a position 25 meters ("m") ahead of the lamp by light radiated from the lamp unit shown in FIG. 2.

As shown in FIG. 2, the lamp unit 20 includes a projection lens 35 disposed on an optical axis Ax extending in a vehicular longitudinal direction; an LED (light-emitting diode) 25 as a light source disposed rearward of a rear side focal point F of the projection lens 35; a reflector 27 that reflects direct light from the LED 25 to the front towards the optical axis Ax; and a shade 29L that is disposed between the projection lens 35 and the LED 25, and forms a cut-off line of a light distribution pattern by blocking a part of reflected light from the reflector 27 and a part of the direct light from the LED 25.

The LED 25 is a white light-emitting diode having a single light-emitting chip 25*a* whose size is about 1 millimeter ("mm") square, for instance. The LED 25 is disposed rearward of the rear side focal point F of the projection lens 35, and directed upward in the vertical direction on the optical axis Ax in the state where the LED 25 is supported by a substrate 33.

As shown in FIG. 3 and FIG. 4, the reflector 27 is a generally dome-shaped member provided on an upper side of the LED 25, and has a reflective surface 27*a* that collects and reflects light L1 from the LED 25 to the front towards the optical axis Ax.

This reflective surface 27*a* is formed in a shape of an ellipsoidal reflective surface in which the optical axis Ax is set as a central axis. Specifically, this reflective surface 27*a* has a vertical cross-section including the optical axis Ax that is set to be a generally ellipsoidal shape, and an eccentricity thereof is set to gradually increase from the vertical cross-section to a horizontal cross-section.

However, rear side vertexes of ellipses forming the respective cross-sections are set at the same position, and the LED 25 is disposed on a first focal point of the ellipse forming the vertical cross-section of this reflective surface 27*a*. Accordingly, it is designed such that the reflective surface 27*a* collects and reflects the light L1 from the LED 25 to the front towards the optical axis Ax, and, at that time, the light is generally converged on a second focal point of the ellipse on the vertical cross-section including the optical axis Ax.

Further, a first reflective surface that reflects a part of the direct light from the LED 25 downward to the front of the shade 29L is formed on a tip portion of the reflector 27, as shown in FIG. 5.

The first reflective surface is formed further on a tip portion of an effective reflective surface of the reflective surface 27*a* of the reflector 27. The first reflective surface includes a first reflective surface 31 for left-side light distribution that reflects light from the LED 25 towards a second reflective surface 38 for left-side light distribution formed on the front of the shade 29L for left-side light distribution that forms a cut-off line of a light distribution pattern for left-side light distribution (refer to FIG. 6) and below the rear side focal point F of the projection lens 35, and a first reflective surface 32 for right-side light distribution that reflects light from the LED 25 towards a second reflective surface 39 for right-side light distribution formed on the front of a shade 29R for right-side light distribution that forms a cut-off line of a light distribution pattern for right-side light distribution (refer to FIG. 8) and below the rear side focal point F of the projection lens 35.

The first reflective surface 31 for left-side light distribution is formed in a shape of an ellipsoidal reflective surface having a vertical cross-section that is generally ellipsoidal in shape and whose first focal point and second focal point are respectively set to the LED 25 and the second reflective surface 38 for left-side light distribution. Further, the second reflective surface 38 for left-side light distribution is formed in a generally flat shape having a linear vertical cross-section.

Besides, each of these first reflective surface 31 for left-side light distribution and second reflective surface 38 for left-side light distribution is laterally divided into two. Further, it is structured such that reflected light L3*a* reflected by a first reflective surface 31*a* for left-side light distribution and a second reflective surface 38*a* for left-side light distribution radiates "H-4R" on H line in a low-beam left-side light distribution pattern with a predetermined amount of light, and reflected light L3*b* reflected by a first reflective surface 31*b* for left-side light distribution and a second reflective surface 38*b* for left-side light distribution radiates "H-8R" on the H line in the pattern with a predetermined amount of light, which is a requirement imposed by a European regulation (ECE R112) (refer to FIG. 7).

Similar to the first reflective surface 31 for left-side light distribution, the first reflective surface 32 for right-side right distribution is formed in a shape of an ellipsoidal reflective surface having a vertical cross-section that is generally ellipsoidal in shape and whose first focal point and second focal point are respectively set to the LED 25 and the second reflective surface 39 for right-side light distribution. Further, the second reflective surface 39 for right-side light distribution is also formed in a generally flat shape having a linear vertical cross-section.

Each of these first reflective surface 32 for right-side light distribution and second reflective surface 39 for right-side light distribution is also laterally divided into two.

Further, it is structured such that reflected light L3*a* reflected by a first reflective surface 32*a* for right-side light distribution and a second reflective surface 39*a* for right-side light distribution radiates "H-4L" on H line in a low-beam right-side light distribution pattern with a predetermined amount of light, and reflected light L3*b* reflected by a first reflective surface 32*b* for right-side light distribution and a second reflective surface 39*b* for right-side light distribution radiates "H-8L" on the H line in the pattern with a predetermined amount of light.

The projection lens 35 is formed of a planoconvex lens, a front side surface of which is a convex surface and a rear side surface of which is a flat surface. This projection lens 35 is disposed on the optical axis Ax so that the rear side focal point F thereof is positioned on a second focal point of the reflective surface 27*a* of the reflector 27, as shown in FIG. 3 and FIG. 4. Accordingly, an image on a focal plane including the rear side focal point F is set to be projected forward as an inverted image.

In one or more embodiments of the present invention, the shade 29L has a shape of a block that also serves as a supporting frame of the projection lens 35, and the shade 29L is disposed between the projection lens 35 and the LED 25, as shown in FIG. 2 and FIG. 6. Further, the shade 29L has a front end edge 29*c* that positions in the vicinity of the rear side focal point F of the projection lens 35 and blocks a part of the reflected light from the reflector 27 to form a cut-off line of the left-side light distribution pattern, and the shade 29L has an upper surface 29*a* that extends rearward from the front end edge 29*c* and reflects a part of the reflected light from the reflector 27 on the upper side. A light control surface 36 to which reflective surface treatment is applied is formed on the upper surface 29*a*.

Specifically, the shade 29L is designed such that, by reflecting a part of the reflected light from the reflector 27 upward using the light control surface 36, most of the light to be emitted upward from the projection lens 35 is converted into the light L2 emitted downward from the projection lens 35, thereby enhancing a luminous flux utilization factor of the light emitted from the LED 25, as shown in FIG. 3 and FIG. 4.

Specifically, the light control surface 36 is formed of a horizontal cut-off formation surface 37*a* extending horizontally in the right direction of a vehicle generally from the optical axis Ax (in the left direction in FIG. 6), an oblique cut-off formation surface 37*b* extending obliquely downward by 15° in the left direction generally from the optical axis Ax (in the right direction in FIG. 6), and a horizontal cut-off formation surface 37*c* extending horizontally in the left direction from the oblique cut-off formation surface 37*b* (in the right direction in FIG. 6). The front end edge (namely, an edge line between the light control surface 36 and a front end surface 29*b* of the shade 29L) 29*c* is formed so as to pass through the rear side focal point F of the projection lens 35.

Further, of the light emitted from the LED 25, a part of the light reflected by the reflective surface 27*a* of the reflector 27 is incident on the light control surface 36 of the shade 29L, and the remainder of the light is incident directly on the projection lens 35. At that time, the light incident on the light control surface 36 is incident on the projection lens 35 by being reflected upward by the light control surface 36, and the light is emitted as the downward directed light L2 from the projection lens 35.

Note that the front end edge 29*c* of the shade 29L is formed in a curved shape in which lateral ends thereof protrude forward in a plane view so as to correspond to a field curvature of the projection lens 35. The curved front end edge 29*c* coincides with a focal group of the projection lens 35. Specifically, the front end edge 29*c* of the shade 29L is formed along the focal group of the projection lens 35, and a shape of the front end edge 29*c* directly corresponds to a shape of the cut-off line.

Further, the aforementioned second reflective surface 38 for left-side light distribution is integrally formed towards the left direction of the vehicle (on the front of the horizontal cut-off formation surface 37*c*) in the vicinity of the front end edge 29*c* of the shade 29L.

Specifically, in the lamp unit 20 of one or more embodiments of the present embodiment, a part of the direct light from the LED 25 is reflected by the first reflective surface 31 having a shape of an ellipsoidal reflective surface formed on the tip portion of the reflector 27. Then, the light is reflected towards the projection lens 35 by the second reflective surface 38 having a shape of a generally flat surface formed on the front of the shade 29L and below the rear side focal point F of the projection lens 35, as shown in FIG. 3 and FIG. 4. Subsequently, the light incident on the projection lens 35 from the second reflective surface 38 is emitted as the upward directed radiated light L3*b*, which radiates above a cut-off line CL3 of the low-beam light distribution pattern PL.

Next, the lamp unit 40 will be described.

As shown in FIG. 1, the lamp unit 40 includes a light-emitting diode as a light source (not shown), a reflector 47, and a projection lens 45. The light-emitting diode has the same structure as that of the LED 25 of the lamp unit 20, and is disposed on an optical axis Ax by being directed upward in the vertical direction.

The reflector 47 is a generally dome-shaped member provided on an upper side of the light-emitting diode. Further, the reflector 47 has a reflective surface having a shape of an ellipsoidal reflective surface that collects and reflects light from the light-emitting diode to the front, with high light collecting power compared to that of the reflective surface 27*a* of the reflector 27.

The projection lens 45 is formed of a planoconvex lens that has a convex front side surface and a flat rear side surface. The projection lens 45 is disposed on the optical axis Ax so that a rear side focal point of the projection lens 45 is positioned on a second focal point of the reflective surface of the reflector 47, and, accordingly, an image on a focal plane including the rear side focal point is set to be projected forward as an inverted image. Note that the projection lens 45 uses a lens whose diameter is larger than that of the projection lens 35 of the lamp unit 20 so that the radiated light from the lamp unit 40 reaches further distances.

Further, as shown in FIG. 7, the diffusion zone formation pattern WZ formed by the lamp unit 20 is a light distribution pattern for left-hand traffic having a cut-off line CL1 of a vehicle's own lane side and a cut-off line CL3 of an opposite lane side, which extend in a horizontal direction, and an oblique cut-off line CL2, on an upper end edge of the diffusion zone formation pattern WZ.

Further, a light distribution pattern 4SZ is a light distribution pattern in which the reflected light L3*a* reflected by the first reflective surface 31*a* for left-side light distribution and the second reflective surface 38*a* for left-side light distribution radiates "H-4R" on the H line in the low-beam left-side light distribution pattern with a predetermined amount of light. Further, a light distribution pattern 8SZ is a light distribution pattern in which the reflected light L3*b* reflected by the first reflective surface 31*b* for left-side light distribution and the second reflective surface 38*b* for left-side light distribution radiates "H-8R" on the H line in the low-beam left-side light distribution pattern with a predetermined amount of light.

Further, the hot zone formation pattern HZ of the lamp unit 40 is formed by the lamp unit 40 so as to overlap with the diffusion zone formation pattern WZ, and is a hot zone formation pattern in which a light collecting power is higher than that in the diffusion zone formation pattern WZ.

Accordingly, the diffusion zone formation pattern WZ, the hot zone formation pattern HZ, and the light distribution patterns 4SZ and 8SZ overlap in the illustrated manner, thereby forming the low-beam light distribution pattern PL of the vehicular lamp 100 as a combined light distribution pattern.

Specifically, with the use of the vehicular lamp unit 20 of the vehicular lamp 100 according to one or more embodiments of the present invention, a part of the direct light from the LED 25 is reflected by the first reflective surfaces 31*a*, 31*b* formed on the tip portion of the reflector 27, and the light is then reflected towards the projection lens 35 by the second reflective surfaces 38*a*, 38*b* formed on the front of the shade 29L and below the rear side focal point F of the projection lens 35. Subsequently, the light incident on the projection lens 35 from the second reflective surfaces 38*a*, 38*b* is emitted as the upward directed radiated lights L3*a*, L3*b*, which enables radiation above the cut-off line CL3 of the opposite lane side of the low-beam light distribution pattern PL.

Therefore, the vehicular lamp unit 20 can radiate the predetermined amount of reflected light, with such a level that the light does not give a glare to a vehicle on the opposite lane, also onto the above the cut-off line CL3 of the opposite lane side, which improves the forward visibility.

Further, when the first reflective surfaces 31*a*, 31*b* are formed as reflective surfaces each having a shape of an ellipsoidal reflective surface as in the vehicular lamp unit 20 of one or more embodiments of the present invention, it is possible to improve a design flexibility regarding the light distribution pattern of the radiated light and the amount of radiated light that radiates above the cut-off line of the low-beam light distribution pattern PL. Further, when the second reflective surfaces 38*a*, 38*b* are formed as reflective surfaces each having a generally flat shape as in the vehicular lamp unit 20 of one or more embodiments of the present invention, it is possible to easily obtain diffused light.

Further, because the first reflective surfaces 31, 32 of one or more embodiments of the present invention are integrally formed further on the tip side of the effective reflective surface of the reflective surface 27*a* of the reflector 27, it is possible to effectively utilize the reflector 27 without influencing the light L1 of a main light distribution, and to easily manufacture the reflector 27.

Further, the first reflective surfaces 31, 32 are positioned further on the LED 25 side of the rear side focal point F of the projection lens 35 and are formed close to the LED 25, so that sizes of the first reflective surfaces 31, 32 can be reduced. Note that a light source image of the reflected light from the first reflective surfaces 31, 32 close to the LED 25 becomes large, which enables radiation of weak light over a wide range to the above the H line.

Further, the lamp unit 20 of one or more embodiments of the present invention is used as a diffusing-type lamp unit having the lowest light collecting power in the vehicular lamp 100 that combines a light distribution from another lamp unit 40 having a light collecting power higher than that of the lamp unit 20 to form the entire low-beam light distribution pattern PL.

Accordingly, in cases that the vehicular lamp 100 combines the light distributions from the plurality of lamp units 20, 40 to form the entire low-beam light distribution pattern PL, by forming the first reflective surface 31 and the second reflective surface 38 on the reflector 27 and the shade 29L, respectively, in the diffusing-type lamp unit 20 having a light collecting power lower than that of another lamp unit 40, it is possible to easily radiate above the cut-off line CL3 of the low-beam light distribution pattern PL in a diffused manner along a vehicle width direction.

Figure 8:
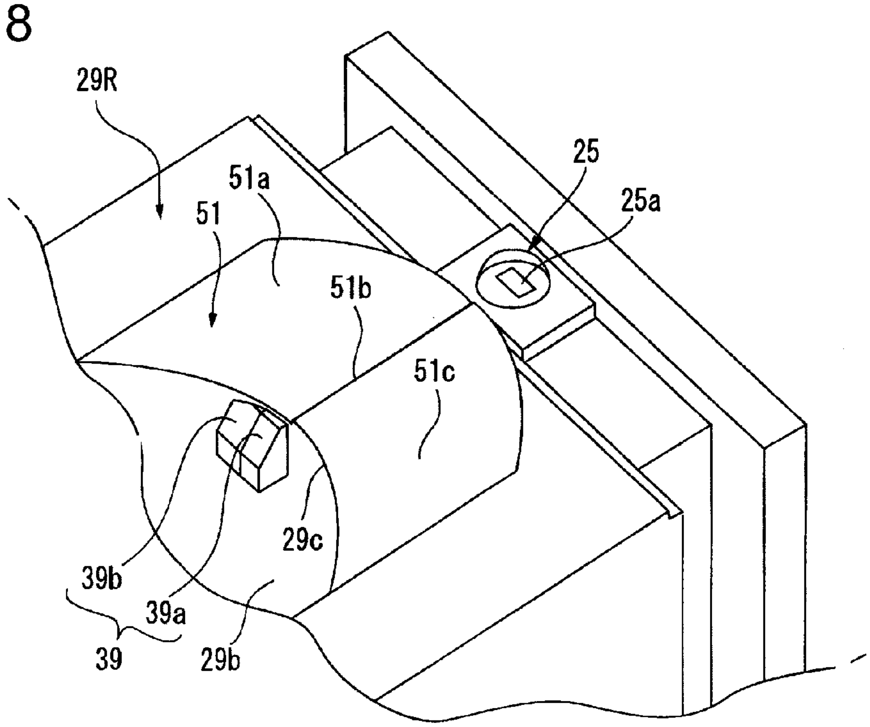
FIG. 8 is an upper perspective view of a shade for right-side light distribution that forms a cut-off line of a light distribution pattern for right-side light distribution.

FIG. 8 is an upper perspective view of the shade 29R for right-side light distribution that forms a cut-off line of a light distribution pattern for right-side light distribution.

Similar to the shade 29L of the aforementioned embodiments, the shade 29R has a front end edge 29*c* that positions in the vicinity of the rear side focal point F of the projection lens 35 and blocks a part of the reflected light from the reflector 27 to form the cut-off line of the right-side light distribution pattern, and has an upper surface 29*a* that extends rearward from the front end edge 29*c* and reflects a part of the reflected light from the reflector 27 on the upper side. A light control surface 51 to which reflective surface treatment is applied is formed on the upper surface 29*a*.

The light control surface 51 is formed of a horizontal cut-off formation surface 51*a* extending horizontally in the right direction of the vehicle generally from the optical axis Ax (in the left direction in FIG. 8), an oblique cut-off formation surface 51*b* extending obliquely upward by 15° in the left direction generally from the optical axis Ax (in the right direction in FIG. 8), and a horizontal cut-off formation surface 51*c* extending horizontally in the left direction from the oblique cut-off formation surface 51*b* (in the right direction in FIG. 8). The front end edge (namely, an edge line between the light control surface 51 and a front end surface 29*b* of the shade 29R) 29*c* is formed so as to pass through the rear side focal point F of the projection lens 35.

Further, of the light emitted from the LED 25, a part of the light reflected by the reflective surface 27*a* of the reflector 27 is incident on the light control surface 51 of the shade 29R, and the remainder of the light is incident directly on the projection lens 35. At that time, the light incident on the light control surface 51 is incident on the projection lens 35 by being reflected upward by the light control surface 51, and the light is emitted as the downward directed light L2 from the projection lens 35.

Further, the second reflective surface 39 for right-side light distribution is integrally formed towards the right direction of the vehicle (on the front of the horizontal cut-off formation surface 51*a*) in the vicinity of the front end edge 29*c* of the shade 29R.

Therefore, only by using the shade 29R instead of the shade 29L in the lamp unit 20 of the aforementioned embodiments, it is possible to change the lamp unit 20 for left-side light distribution into a lamp unit for right-side light distribution.

At this time, the aforementioned reflector 27 is previously provided with the first reflective surface 31 for left-side light distribution and the first reflective surface 32 for right-side light distribution, so that the reflector 27 can be used for both the lamp unit 20 for right-side light distribution and the lamp unit for left-side light distribution. Therefore, it is also possible to reduce the manufacturing cost by reducing the number of parts at the time of manufacturing the lamp unit 20 for right-side light distribution and the lamp unit for left-side light distribution.

The vehicular lamp unit and the vehicular lamp of the present invention may be modified in structure from the aforementioned embodiments, and various embodiments may be adopted within the spirit of the present invention.

For instance, although the vehicular lamp 100 of the aforementioned embodiments is structured such that the plurality of lamp units are housed side-by-side in the lamp chamber, one or more embodiments of the present invention may employ a single lamp unit. Further, the light source is described as a semiconductor light-emitting element such as a light-emitting diode, however, a discharge bulb such as a metal halide bulb and a halogen bulb may also be used.

While description has been made in connection with exemplary embodiments of the present invention, it will be obvious to those skilled in the art that various changes and modification may be made therein without departing from the present invention. It is aimed, therefore, to cover in the appended claims all such changes and modifications falling within the true spirit and scope of the present invention.

DESCRIPTION OF THE REFERENCE NUMERALS

20 Lamp Unit (Vehicular Lamp Unit)
25 Led (Light Source)
27 Reflector
29L Shade
29*a* Upper Surface
29*c* Front End Edge
31 First Reflective Surface for Left-Side Light Distribution (First Reflective Surface)
32 First Reflective Surface for Right-Side Light Distribution (First Reflective Surface)
35 Projection Lens
36 Light Control Surface
38 Second Reflective Surface for Left-Side Light Distribution (Second Reflective Surface)
39 Second Reflective Surface for Right-Side Light Distribution (Second Reflective Surface)
40 Lamp Unit (Another Vehicular Lamp Unit)
100 Vehicular Lamp
Ax Optical Axis
CL Cut-Off Line
CL1 Cut-Off Line Of Vehicle'S Own Lane Side
CL2 Oblique Cut-Off Line
CL3 Cut-Off Line Of Opposite Lane Side
F Rear Side Focal Point

What is claimed is:

1. A vehicular lamp unit comprising:
- a projection lens disposed on an optical axis extending in a vehicular longitudinal direction;
- a light source disposed rearward of a rear side focal point of the projection lens;
- a reflector reflecting direct light from the light source forward towards the optical axis;
- a shade disposed between the projection lens and the light source such that the shade blocks a part of reflected light from the reflector and a part of the direct light from the light source to form a cut-off line of a light distribution pattern;
- a first reflective surface formed on a tip portion of the reflector such that the first reflective surface reflects a part of the direct light from the light source downward to the front of the shade; and
- a second reflective surface formed on the front of the shade and below the rear side focal point of the projection lens such that the second reflective surface reflects reflected light from the first reflective surface towards the projection lens,
- wherein the first reflective surface is formed in a shape of an ellipsoidal reflective surface having a vertical cross-section that is generally ellipsoidal in shape, and
- wherein the second reflective surface is formed in a generally flat shape having a linear vertical cross-section.

2. The vehicular lamp unit according to claim 1, wherein the first reflective surface comprises:
- a first reflective surface for right-side light distribution that reflects light from the light source towards the second reflective surface for right-side light distribution formed on the front of the shade for right-side light distribution that forms a cut-off line of a light distribution pattern for right-side light distribution and below the rear side focal point of the projection lens; and
- a first reflective surface for left-side light distribution that reflects light from the light source towards the second reflective surface for left-side light distribution formed on the front of the shade for left-side light distribution that forms a cut-off line of a light distribution pattern for left-side light distribution and below the rear side focal point of the projection lens.

3. A vehicular lamp wherein an entire light distribution pattern is formed by combining a light distribution from the vehicular lamp unit according to claim 1, and a light distribution from another vehicular lamp unit having a light collecting power higher than a light collecting power of the vehicular lamp unit.

4. A vehicular lamp wherein an entire light distribution pattern is formed by combining a light distribution from the vehicular lamp unit according to claim 2, and a light distribution from another vehicular lamp unit having a light collecting power higher than a light collecting power of the vehicular lamp unit.

5. A method of manufacturing a vehicular lamp unit comprising:

disposing a projection lens on an optical axis extending in a vehicular longitudinal direction;

disposing a light source rearward of a rear side focal point of the projection lens;

disposing a reflector so as to reflect direct light from the light source forward towards the optical axis;

disposing a shade between the projection lens and the light source such that the shade blocks a part of reflected light from the reflector and a part of the direct light from the light source to form a cut-off line of a light distribution pattern;

forming a first reflective surface on a tip portion of the reflector such that the first reflective surface reflects a part of the direct light from the light source downward to the front of the shade; and forming a second reflective surface on the front of the shade and below the rear side focal point of the projection lens such that the second reflective surface reflects reflected light from the first reflective surface towards the projection lens, wherein the first reflective surface is formed in a shape of an ellipsoidal reflective surface having a vertical cross-section that is generally ellipsoidal in shape, and wherein the second reflective surface is formed in a generally flat shape having a linear vertical cross-section.

6. The method according to claim 5, wherein the first reflective surface comprises:

a first reflective surface for right-side light distribution that reflects light from the light source towards the second reflective surface for right-side light distribution formed on the front of the shade for right-side light distribution that forms a cut-off line of a light distribution pattern for right-side light distribution and below the rear side focal point of the projection lens; and a first reflective surface for left-side light distribution that reflects light from the light source towards the second reflective surface for left-side light distribution formed on the front of the shade for left-side light distribution that forms a cut-off line of a light distribution pattern for left-side light distribution and below the rear side focal point of the projection lens.

7. A method of forming an entire light distribution pattern comprising: combining a light distribution from the vehicular lamp unit manufactured according to the method of claim 5, and a light distribution from another vehicular lamp unit having a light collecting power higher than a light collecting power of the vehicular lamp unit.

8. A method of forming an entire light distribution pattern comprising: combining a light distribution from the vehicular lamp unit manufactured according to the method of claim 6, and a light distribution from another vehicular lamp unit having a light collecting power higher than a light collecting power of the vehicular lamp unit.

* * * * *